United States Patent
Seinen et al.

(10) Patent No.: US 6,509,784 B2
(45) Date of Patent: Jan. 21, 2003

(54) SWITCHED MODE POWER SUPPLY CONTROL

(75) Inventors: Erwin Gerhardus Reginaldus Seinen, Nijmegen (NL); Joan Wichard Strijker, Nijmegen (NL); Constantinus Paulus Meeuwsen, Nijmegen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/906,600

(22) Filed: Jul. 17, 2001

(65) Prior Publication Data

US 2002/0011886 A1 Jan. 31, 2002

(30) Foreign Application Priority Data

Jul. 20, 2000 (EP) .............................. 00202608

(51) Int. Cl.⁷ ............................ H03M 7/217; G05F 1/40
(52) U.S. Cl. ................... 327/530; 323/283; 363/18; 327/172
(58) Field of Search ............... 327/530, 50, 172, 327/538, 544; 363/21, 127, 18; 323/283

(56) References Cited

U.S. PATENT DOCUMENTS 5,917,716 A * 6/1999 Cho ..................... 363/21
5,940,287 A * 8/1999 Brkovic .................. 363/127

* cited by examiner

Primary Examiner—Dinh T. Le
(74) Attorney, Agent, or Firm—Steven R. Biren

(57) ABSTRACT

In an integrated circuit (IC) for providing an enabling signal (EN) to a converter, the integrated circuit (IC) includes a monitoring circuit (FET1, R2, D1, Io, M, S1) for providing a control signal (CS) in response to a level of a line voltage (Vline) on a first connection terminal (8) of the integrated circuit (IC), and a start-up circuit (FET2, Istrt_up, Vcc_strt-Lev, COMP, S2) for providing the enabling signal (EN) to the converter in response to the control signal (CS) and a generated voltage level (Vcc), the generated voltage level (Vcc) being generated in response to the level of the line voltage (Vline) on the first connection terminal (8). The monitoring circuit and the start-up circuit sense the level of the line voltage (Vline) only via the first connection terminal (8).

2 Claims, 2 Drawing Sheets

SWITCHED MODE POWER SUPPLY CONTROL

FIELD OF THE INVENTION

The present invention relates to a switched mode power supply (SMPS) control circuit, and to a switched mode power supply (SMPS) comprising such a control circuit.

BACKGROUND OF THE INVENTION

In an SMPS, the maximum output power is often dependent on the supply voltage. Below a certain input voltage level, the required output power cannot be supplied by the SMPS due to current limitations of the power switches in the SMPS, maximum allowed current in the fuses at the input of the SMPS or maximum allowed current through the transformer. In many cases these limitations will result in audible noise of the transformer.

To prevent the SMPS from starting at a too low input voltage level (and thus preventing audible noise), a circuit has to disable the operation of the SMPS. In prior art systems operating at a rectified line (mains) voltage, external components are required in order to determine the level of the line voltage. These external components require that at least one extra pin is available on the circuit.

In prior art SMPS systems that supply from a rectified line voltage (Vline), detection of the line voltage is performed using e.g. an external voltage divider. Alternatively, a voltage to current converter with an external resistor may be used.

It is a disadvantage of the prior art systems that an extra pin on the integrated circuit (IC) is required in order to determine the level of the line voltage. In addition, the use of external components complicates the implementation of such systems.

Integration of ohmic resistive dividers is very complicated for the following reasons. A high-ohmic resistive divider is not suitable for integration, because high ohmic resistive dividers occupy too much silicon area of the IC. Integration of lower ohmic resistive dividers would lead to too much dissipation—and thereby too much heat generation—and power consumption in the IC.

SUMMARY OF THE INVENTION

It is an object of the present invention to provide an improved IC with integrated sensing/monitoring of the line voltage.

The above-mentioned objects are complied with by providing an integrated circuit for providing an enabling signal to a converter, and an SPMS as defined in the independent claims. Advantageous embodiments are defined in the dependent claims.

According to a preferred embodiment, the use of external components for sensing/monitoring the line voltage can be avoided. Furthermore, no extra pin is needed in order to connect the control circuit to external components for sensing the line voltage.

These and other aspects of the invention will be apparent from and elucidated with reference to the embodiments described hereinafter.

DETAILED DESCRIPTION OF THE INVENTION

The present invention relates to a control circuit for an SMPS, where the use of external components or an additional pin for voltage sensing is avoided. The control circuit according to the present invention offers internal determination of the level of the line voltage. Furthermore, in accordance with a preferred embodiment, the SMPS operation enabling level may be tuned/adjusted using a single external resistor R1.

Figure 2:
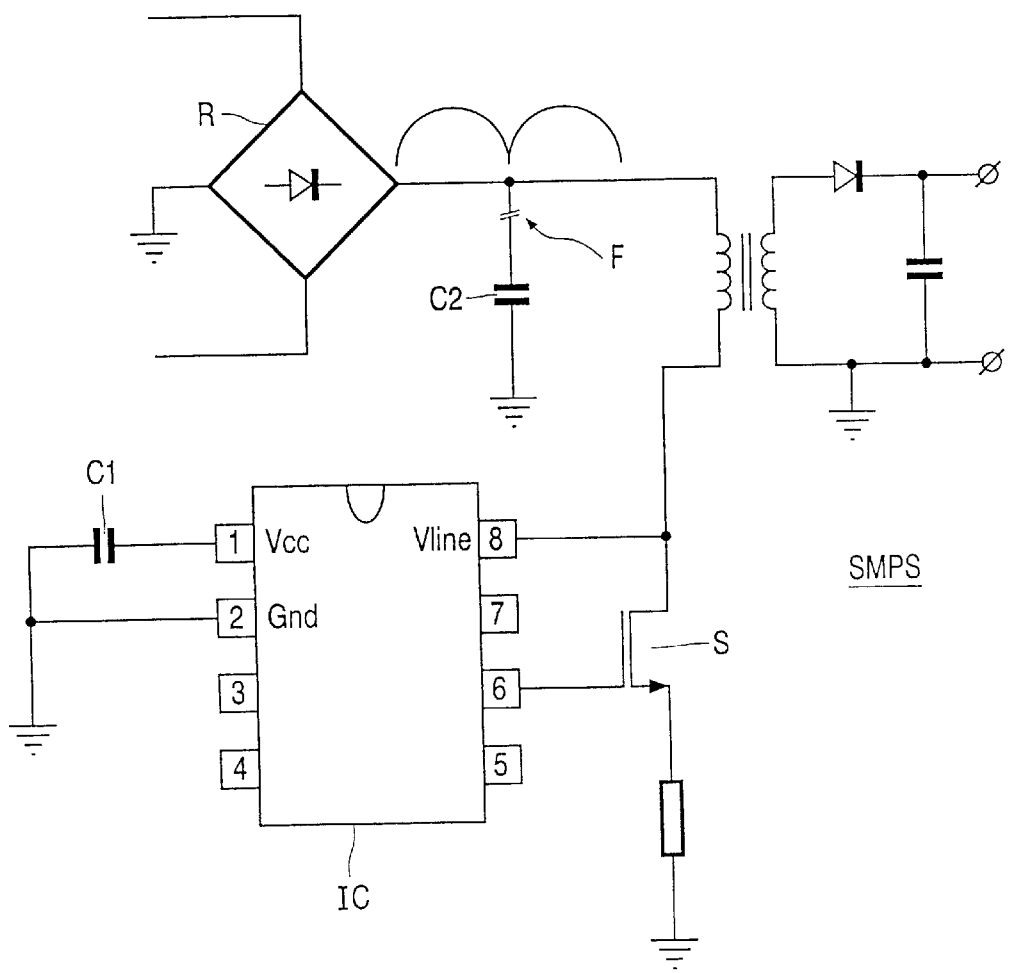
FIG. 2 shows an embodiment of an SMPS in accordance with the present invention with open elcap fault condition F.

An additional advantage of the control circuit according to the present invention is the safety aspect provided by the present invention—e.g. when the line elcap (electrolytic capacitor C2 in FIG. 2) is disconnected, as indicated at F in FIG. 2.

Figure 1:
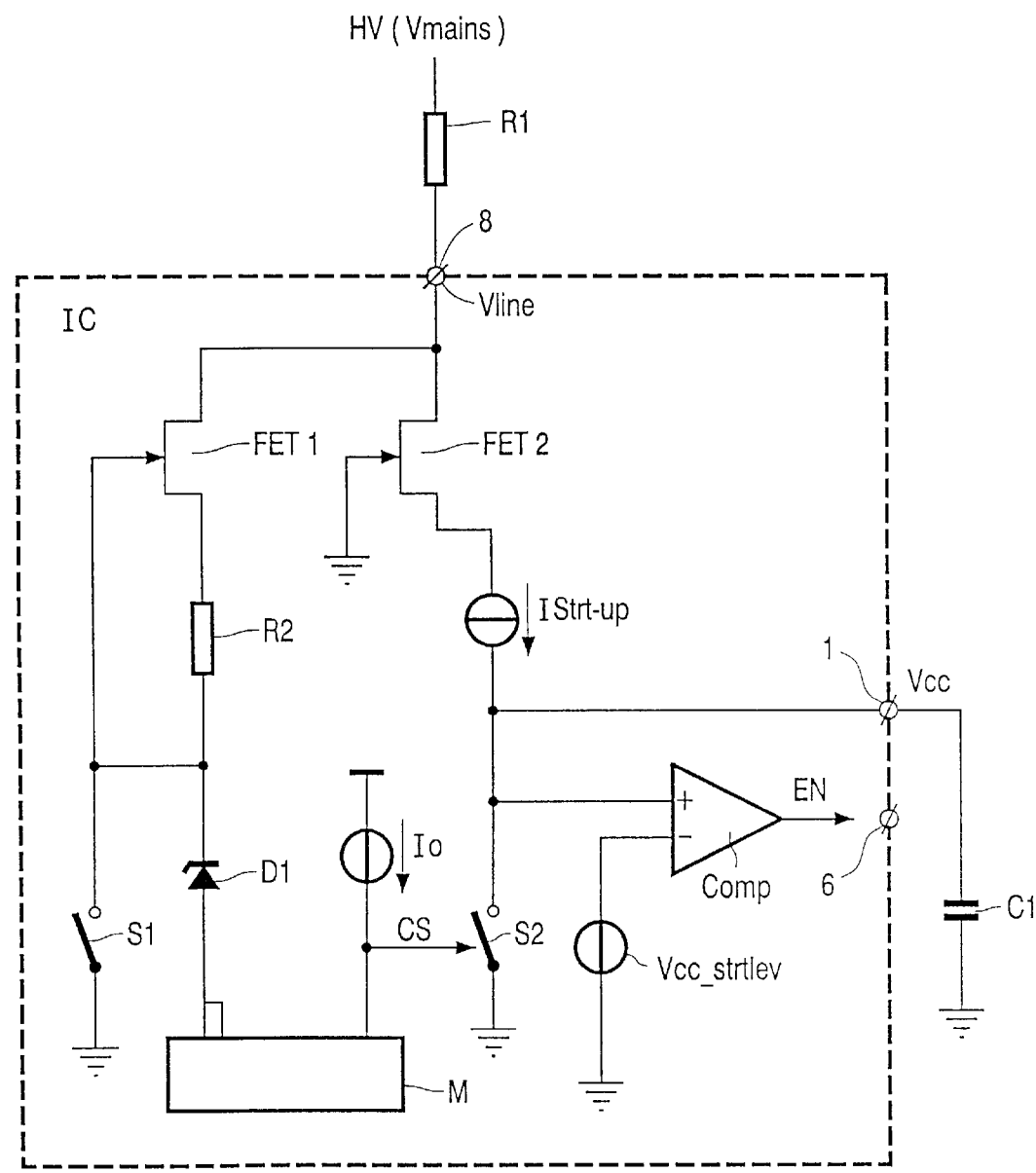
FIG. 1 shows an embodiment of an SMPS control IC in accordance with the present invention with internal operation enabling function where the threshold level can be adjusted using an external resistor R1.

As shown in FIG. 1, the line voltage sensing is done inside the IC. A (high voltage) field effect transistor (FET1) limits the maximum voltage on the resistor. The pinch off voltage of the transistor FET1 is above the desired enabling level (which can be as high as 100V), because the gate of the transistor FET11 is connected to a relatively high (zener) voltage. Due to the high zener voltage of the internal zener diode D1, sensing can be done up to high Vline voltage levels, while keeping the current low. After the SMPS is enabled by the described function—see below, switch S1 is closed. In this way, the pinch off voltage of the transistor FET1 drops significantly wherefore low power consumption is guaranteed. Furthermore, a better resurf of the high voltage transistor FET1 is obtained.

Since switch S1 is controlled by internal logic (not shown), the IC is able to operate down to very low line voltages, but is prevented from starting up at low line voltages.

The operational characteristics of the control circuit will now be described in detail. Normal start-up of an SMPS application applies that a line switch (not shown) is activated, and subsequently the line voltage capacitor C2 in FIG. 2 will be charged whereby the line voltage—Vline—applied to the IC starts to increase.

When Vline is high enough to enable transistor FET2 in the start-up circuit to operate, an internal current source Istrt-up will start trying to charge the external capacitor C1. This is however prevented by the internal switch S2 as long as this switch is closed. In its closed position, switch S2 shorts the external capacitor C1 to ground.

Switch S2 is controlled by the operation enabling sense function, which is connected to the same HV terminal. Transistor FET1 is constantly monitoring the line voltage Vline. Since the detection function is done with very low current, the source voltage of transistor FET1 (source= connected to the resistor R2) is almost the same as the drain voltage (=Vline).

The zener diode D1 has a high breakdown voltage whereby Vline may be monitored even at relatively high voltages keeping the current at very low levels. Preferably the break-down voltage of the zener diode D1 is approximately 80V. Preferably, the break-down voltage is externally adjustable to e.g. 40V.

When Vline exceeds the enabling level, the zener diode D1 goes into breakdown causing a current to flow through transistor FET1, resistor R2 and the zener diode D1. This current is being mirrored by current mirror M and compared with a reference current Io, and via some (latched) logic switch S2 is opened and the internal current source Istart-up will start charging the external capacitor C1.

The voltage Vcc on the external capacitor C1 is constantly compared to a predetermined starting level—Vcc_strt_lev. When Vcc exceeds Vcc_strt_lev, an enabling signal EN is provided and the SMPS starts operating.

Once the start level Vcc_strt_lev is reached, the operation enabling function is disabled and therefore no longer dependent on Vline. Also, and at the same time, the Istrt_up circuit is disabled. The operation enabling function is disabled by closing switch S1 whereby the gate of transistor FET1 is connected to ground. By connecting the gate to zero, the pinch off voltage of transistor FET1 is lowered dramatically, with the result that the zener diode D1 is no longer in breakdown and only a small leakage current will flow through transistor FET1 and the resistor R2. The small leakage current reduces the power consumption of the IC whereby green function is achieved. Preferably, the power consumption is less than 50 mW.

The moment the control circuit stops operating for whatever reason—e.g. over temperature protection, fault detection, over voltage protection etc.—the supply voltage to the control circuit drops to a so-called "Under Voltage Lock Out" (take over supply is no longer present because the converter does not switch anymore), and the IC re-activates Istrt_up whereby the capacitor C1 is recharged. Provided that Vline is above the enabling level, the function is enabled again when Vcc exceeds Vcc_strt_lev. Therefore, the IC will re-start only when Vline is above the predetermined level, but is able to operate down to very low line voltages.

The resistor R1 provides the opportunity to tune or adjust the line voltage enabling level. The current drawn from the HV pin 8 is always the same during start-up (for example 1 mA). Thus, it is easy to adjust the operation enabling level by a level 1 mA*R1, whereby the HV pin's voltage is lowered by 1 mA*R1.

Figure 3:
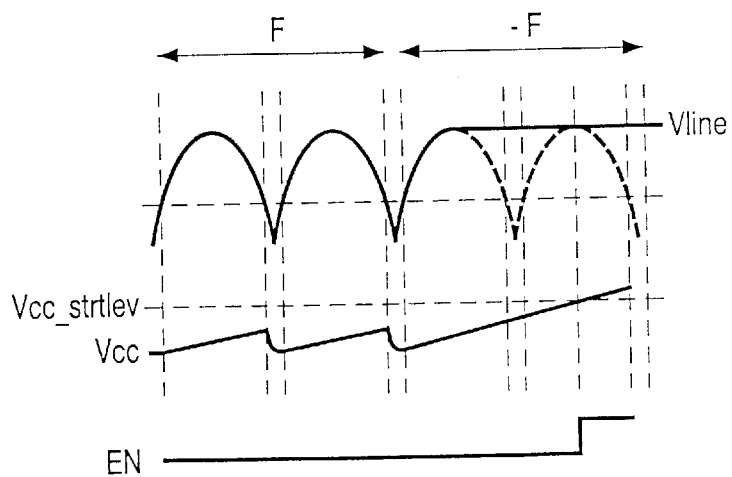
FIG. 3 shows the signals of the SMPS controller during and after "missing elcap" fault condition F.

It is an advantage of the present invention that it protects control circuit operating in an open elcap situation as illustrated at F in FIG. 2. The rectified, but not buffered, line voltage charges the external capacitor C1 (via the start-up current source) only to a low value. When the line voltage is below the low-line trip level (twice every period of the line frequency), the external capacitor C1 is discharged. The voltage Vcc across the external capacitor C1 will never reach the start-up voltage level Vcc_strt_lev as indicated in FIG. 3. Only as soon as the elcap C2 is re-connected, indicated by -F in FIG. 3, the voltage Vcc will reach the start-up voltage level Vcc_strt_lev and the control circuit will start operating.

An external resistor R1 may be connected between the first connection terminal 8 and the mains voltage Vmains so as to generate a voltage drop over the said external resistor R1 and thereby adjust the voltage on the first connection terminal 8. The resistance of the external resistor R1 may be within the range 1–1000 kΩ, such as within the range 10–100 kΩ. The breakdown voltage of the voltage limiting means—e.g. a zener diode D1—may be within the range 25–150V (including preferred typical values at 40V and 80V), such as within the range 50–100V, such as within the range 60–90V, such as approximately 80V. The current limited means may comprise a transistor, such as a MOST transistor.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements.

What is claimed is:

1. An integrated circuit (IC) for providing an enabling signal (EN) to a converter, said integrated circuit (IC) comprising:

a monitoring circuit (FET1, R2, D1, Io, M, S1) for providing a control signal (CS) in response to a level of a line voltage (Vline) on a first connection terminal (8) of the integrated circuit (IC), and a start-up circuit (FET2, Istrt_up, Vcc_strt-Lev, COMP, S2) for providing the enabling signal (EN) to the converter in response to the control signal (CS) and a generated voltage level (Vcc), said generated voltage level (Vcc) being generated in response to the level of the line voltage (Vline) on the first connection terminal (8), wherein the monitoring circuit and the start-up circuit are sensing the level of the line voltage (Vline) only via the first connection terminal (8, and wherein the monitoring circuit (FET1, R2, D1, Io, M, S1) comprises:

a first transistor means (FET1) connected to the first connection terminal (8), current limiting means (R2) connected to the first transistor means (FET1), a voltage limiting device (D1) having a breakdown voltage, said voltage limiting device (D1) being connected to the current limiting means (R2) so that current may be drawn through the first transistor means (FET1), the current limiting means (R2) and the voltage limiting device (D1) when the breakdown voltage across the voltage limiting device (D1) has been exceeded, a reference current source (Io) for providing a reference current, means (M) for comparing the current drawn through the first transistor means (FET1), the current limiting means (R2) and the voltage limiting device (D1) with the provided reference current (Io), and to generate the control signal (CS) when the current drawn through the first transistor means (FET1), the current limiting means (R2) and the voltage limiting device (D1) exceeds the reference current (Io), and a controllable first switching means (S1) for providing, in its closed position, essentially zero voltage across the voltage limiting device (D1) and thereby reduce the current drawn through the first transistor means (FET1) and the current limiting means (R2).

2. An integrated circuit according to claim 1, wherein the start-up circuit (FET2, Istrt_up, Vcc_strt_lev, COMP, S2) comprises:

a second transistor means (FET2) connected to the first connection terminal (8), a current source (Istrt_up) for charging an external capacitor (C1) connected to a second connection terminal (1) of the integrated circuit (IC) when the second transistor means (FET2) starts operating, a reference voltage source (Vcc_strt_lev) for providing a predetermined enabling voltage level, means (COMP) for comparing the predetermined enabling voltage level (Vcc_strt_lev) with the generated voltage level (Vcc), to provide the enabling signal (EN) when the generated voltage level (Vcc) exceeds the predetermined enabling voltage level (Vcc_strt_lev), and a controllable second switching means (S2) for allowing, in its open position, the generation of the generated voltage (Vcc), controlled by the control signal (CS) from the monitoring circuit.

* * * * *